United States Patent [19]
Merkling et al.

[11] Patent Number: 5,841,869
[45] Date of Patent: Nov. 24, 1998

[54] METHOD AND APPARATUS FOR TRUSTED PROCESSING

[75] Inventors: Roger Merkling, Palo Alto; Helmut Fieres, Mountain View; Keith Klemba, Palo Alto, all of Calif.

[73] Assignee: Cheyenne Property Trust, San Francisco, Calif.

[21] Appl. No.: 702,332

[22] Filed: Aug. 23, 1996

[51] Int. Cl.[6] .................................................. H04L 9/00
[52] U.S. Cl. ................................................ 380/25; 380/4
[58] Field of Search ................................ 380/4, 23, 25, 380/30; 340/825.31

[56] References Cited

U.S. PATENT DOCUMENTS

| | | | |
|---|---|---|---|
| 4,885,789 | 12/1989 | Burger et al. | 380/25 |
| 4,918,653 | 4/1990 | Johri et al. | 340/825.31 |
| 4,945,468 | 7/1990 | Carson et al. | 380/25 |
| 4,993,068 | 2/1991 | Piosenka et al. | 380/23 |
| 5,173,939 | 12/1992 | Abadi et al. | 380/25 |
| 5,204,961 | 4/1993 | Barlow | 380/25 |
| 5,341,422 | 8/1994 | Blackledge, Jr. et al. | 380/4 |
| 5,434,919 | 7/1995 | Chaum | 380/30 |
| 5,504,814 | 4/1996 | Miyahara | 380/25 |
| 5,574,786 | 11/1996 | Dayaw et al. | 380/25 |
| 5,596,718 | 1/1997 | Boebert et al. | 380/25 |

FOREIGN PATENT DOCUMENTS 0 266 748 A2  11/1988  European Pat. Off. .
WO 94/01821  1/1994  WIPO .

OTHER PUBLICATIONS

Cynthia E. Irvine, "A Multilevel File System For High Assurance", IEEE Computer Society Symposium On Research In Security And Privacy, May 1995, Oakland, California, USA, pp. 78–88.

Branstad, et al., "The Role Of Trust In Protected Mail", IEEE Computer Society Symposium on Research In Security And Privacy, May 7–9, 1990, Oakland, California, USA, pp. 210–215.

Andrew Hanushevsky, "Security In The IEEE Mass Storage System Reference Model", Twelfth IEEE Symposium On Mass Storage Systems, Apr. 1993, Monterey, California, USA, pp. 67–77.

*Primary Examiner*—Salvatore Cangialosi

[57] ABSTRACT

Trusted processing capability, for example for a cryptographic unit element in an International Cryptography Framework, secures one or more tasks or processes associated with application code. Trusted processing is assured by a trusted element, where use of the trusted element is based upon the principles of separation and locality, i.e. where the trusted element is associated with a trusted computing base that is separated from the operating system and/or data by a trust boundary, and where protected mechanisms are used to access the trusted element, such that trusted execution occurs only locally in a trusted execution area. The trust processing capability also encompasses a policy controlled main CPU.

38 Claims, 11 Drawing Sheets

METHOD AND APPARATUS FOR TRUSTED PROCESSING

BACKGROUND OF THE INVENTION

1. Technical Field

The invention relates to trusted processing. More particularly, the invention relates to a method and apparatus that provides a trusted element that assures trusted processing within an international cryptography framework or other processing environment.

2. Description of the Prior Art

Customers of large computer systems are typically multinational corporations that want to purchase enterprise wide computer based solutions. The distributed nature of such organizations requires them to use public international communications services to transport data throughout their organization. Naturally, they are concerned about the security of their communications and seek to use modern end-to-end cryptographic facilities to assure privacy and data integrity.

The use of cryptography in communications and data storage is governed by national policy and unfortunately, national policies differ with respect to such use. Each national policy is developed independently, generally with a more national emphasis rather than international considerations. There are standards groups that are seeking to develop a common cryptographic algorithm suitable for international cryptography. However, the issue of international cryptographic standards is not a technical problem, but rather it is a political issue that has national sovereignty at its heart. As such, it is not realistic to expect the different national cryptography policies to come into alignment by a technical standardization process.

The issue of national interests in cryptography is a particular concern of companies that manufacture open-standards-based information technology products for a worldwide market. The market expects these products to be secure. Yet, more and more consumers of these products are themselves multinational and look to the manufacturers to help them resolve the international cryptography issues inhibiting their worldwide information technology development. The persistence of unresolved differences and export restrictions in national cryptography policies has an adverse impact on international market growth for secure open computing products. Thus, it would be helpful to provide an international framework that provides global information technology products featuring common security elements, while respecting the independent development of national cryptography policies.

Nations have reasons for adopting policies that govern cryptography. Often these reasons have to do with law enforcement and national security issues. Within each country there can be debates between the government and the people as to the rightness and acceptability of these policies. Rather than engage in these debates or try to forecast their outcome, it is more practical to accept the sovereign right of each nation to establish an independent policy governing cryptography in communication.

Policies governing national cryptography not only express the will of the people and government, but also embrace certain technologies that facilitate cryptography. Technology choice is certainly one area where standardization can play a role. However, as indicated earlier this is not solely a technical problem, such that selection of common cryptographic technologies alone can not resolve the national policy differences. Consequently, it would be useful to provide a common, accepted cryptography framework, wherein independent technology and policy choices can be made in a way that still enables international cryptographic communications consistent with these policies.

A four-part technology framework that supports international cryptography, which includes a national flag card, a cryptographic unit, a host system, and a network security server is disclosed by K. Klemba, R. Merckling, International Cryptography Framework, in a copending U.S. patent application Ser. No. 08/401,588, which was filed on 8 Mar. 1995 now U.S. Pat. No. 5,651,068. Three of these four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. The fourth service element, a Network Security Server (NSS), can provide a range of different security services including verification of the other three service elements.

The framework supports the design, implementation, and operational elements of any and all national policies, while unifying the design, development, and operation of independent national security policies. The framework thus gives standard form to the service elements of national security policies, where such service elements include such things as hardware form factors, communication protocols, and on-line and off-line data definitions.

Critical to the implementation of the framework is the provision of a fundamental technology that allows the production of the various service elements. While various implementations of the service elements are within the skill of those versed in the relevant art, there exists a need for specific improvements to the state of the art if the full potential of the framework is to be realized.

One issue of importance in the framework and other trusted systems is that of composition, i.e. where each and every element of the trusted system must be trusted, because a system composed entirely of trusted elements is both cumbersome and slow. It is therefore desirable to provide only the number of trusted elements that are necessary to assure that the level of desired trust is provided.

Trusted products require the arrangement of some properties into secure systems to be composable. Such properties are preferably provided in accordance with a predefined standard. For example, it is necessary to determine the kinds of relations the trusted elements of the framework bear to one another. It is also necessary to define the security relevant properties of trusted elements when they are engaged in such relations. It is further necessary to determine what inferences may be drawn about the security relevant properties of a composed system from the security relevant properties of the system's constituent elements, i.e. can the trusted element be defeated with knowledge derived from other elements of the system.

Accordingly, it would be advantageous to define and implement a trusted processing function within the confines of the framework or other processing system.

SUMMARY OF THE INVENTION

The international cryptography framework allows manufacturers to comply with varying national laws governing the distribution of cryptographic capabilities. In particular, such a framework makes it possible to ship cryptographic capabilities worldwide in all types of information processing devices (e.g. printers, palm-tops). Within the framework, a cryptographic unit contains several cryptographic methods (e.g. DES, RSA, MD5).

The invention provides a trusted processing element, for example in an international cryptography framework or other trusted processing application. For purposes of the disclosure herein, the element of trust is defined in accordance with ISO/IEC 10081-1, i.e. where element x trusts element y for some classes of activity in the context of a security policy, if and only if element x has confidence that element y behaves in a well-defined way that does not violate the security policy.

The invention provides a method and apparatus that solves the problem of composition by providing a trusted computing base that is accessed by an application having a limited number of trusted execution streams. Such execution streams are easy to control/define as trusted. The architecture of the invention defines simple relationships between those areas which are considered as trusted versus those that are executed.

The trusted processing element is implemented in accordance with various principles, including:

Separation—At any level of execution, clean separation of the security functionality from other functionality is employed to minimize the amount of functionality that must be trusted and therefore increase the level of trust that can be achieved. Hence, at one extreme end of the spectrum there is a singular execution of the instruction. Practically, systems or kernel implementations refer to an atomic execution element as a single task or thread, and protected interprocess communication mechanisms.

Thus, to execute in a trusted zone or area, it is necessary to have insurance of confidentiality of compartments. The compartments represent executable code or a combination of code and data. Thus, the principle of separation provides a first step for implementing trusted execution, which is that the system must have compartment areas where the execution streams are used to pass executable code to the trusted computing base. This principle leads to confidentiality in a system, but the separation principle is not sufficient to fulfill integrity.

Locality—Any part of a system that is permitted to process information is able to corrupt that information. Therefore, preserving the integrity of the information depends on the level of trust of the constituent parts of the system that handle the information. If the data or instructions are executed locally, the trust element only has control of the information within the trust boundary, i.e. it has no control outside and vice versa. There is by definition a lack of trust outside of the partition established by the trust boundary because, once the information is outside of the compartment, it is free to participate in untrustworthy executions. Thus, the invention implements the principle of locality, i.e. executions that are related to processes or tasks in the partition are operated upon only locally in the trusted computing base.

As an application of the first principle, the trusted processing capability of a cryptographic unit, as controlled by a policy card, becomes a trusted execution area where critical applications transform sensitive information. Such information uses protected mechanisms, i.e. envelopes, to leave the trusted execution area or to join the user level task before local execution by the cryptographic unit.

Within the trusted processing element (for example, as applied to a cryptographic unit), the main CPU participates in processing trusted partitions that are controlled by the policy.

Fundamental properties of the trusted processing element include:

Encapsulated single tasks;

Use of closely coupled, reconfigurable kernel components; and

Execution of adaptation policies in a secure vault to prevent unauthorized uses of privileges.

Thus, the trusted processing element provides a trust controlled processor, such that system/application processing proceeds in a trusted fashion.

DETAILED DESCRIPTION OF THE INVENTION

National cryptography policy often varies by industry segment, political climate, and/or message function. This makes it difficult to assign one uniform policy across all industries for all time. Consequently, the flexibility of a cryptography framework that incorporates a national flag card is very attractive. The invention is therefore directed to resolving problems surrounding international cryptography. In a preferred embodiment of the invention, a trusted processing element is provided, for example in conjunction with a cryptography unit for a framework that may be used to support the design and development of any national policy regarding cryptography. Thus, the invention establishes a trust boundary such that both the use of cryptography and the use of a system protected by the cryptography are controlled in a trusted and tamper proof manner. It should be appreciated that the invention, although described in connection with an international cryptography framework, may be applied in any system environment where a trusted processing element is desired.

Figure 1:
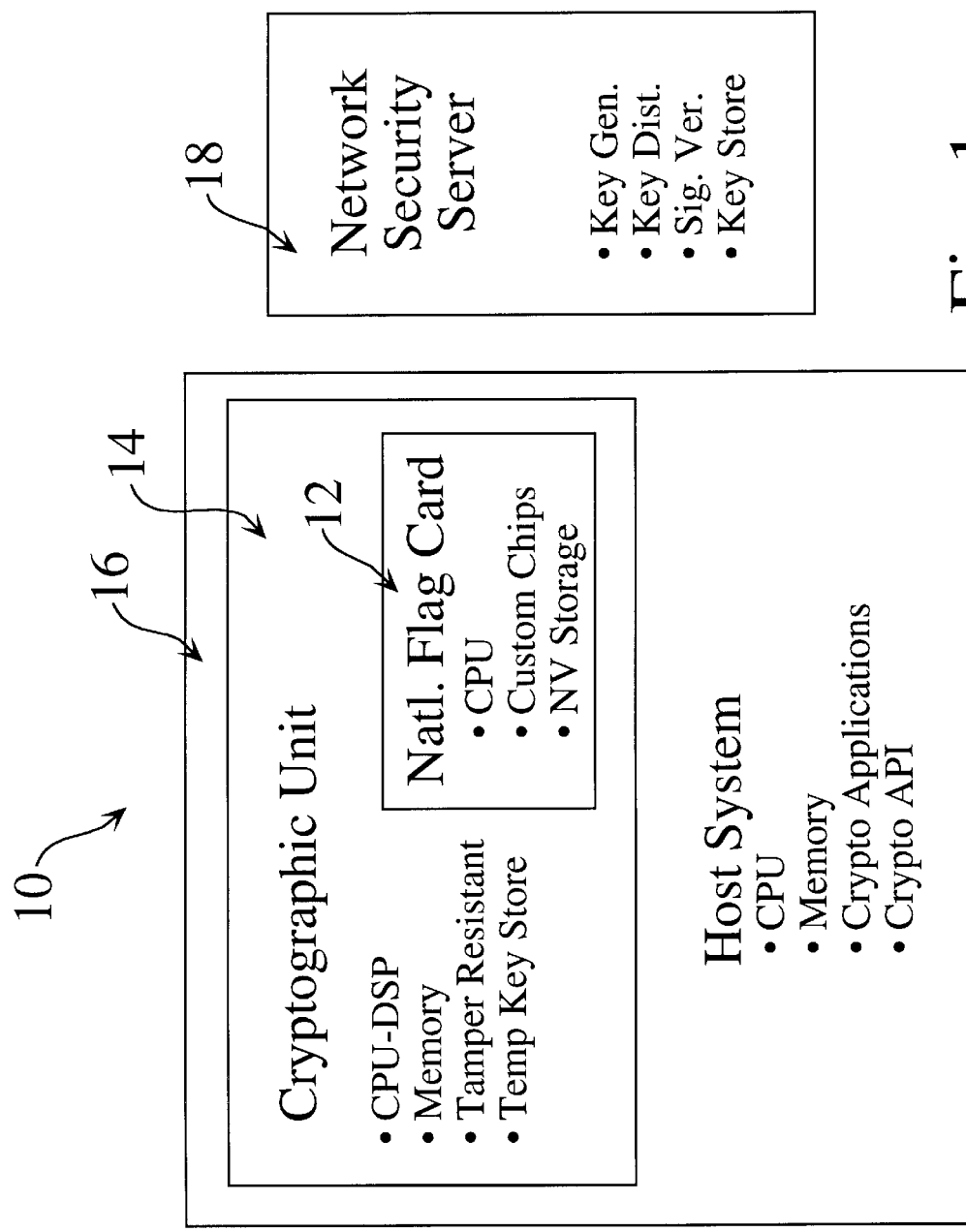
FIG. 1 is a block diagram of an international cryptography framework, including a national flag card, a cryptographic unit, a host system, and a network security server.

The cryptography unit in which the preferred embodiment of the invention is implemented preferably resides in an international cryptography framework that has four service elements, each offering different types of services. FIG. 1 is a block diagram of the international cryptography framework (ICF) 10, including a national flag card 12, a cryptographic unit 14, a host system 16, and a network security server 18. Three of the four service elements have a fundamentally hierarchical relationship. The National Flag Card (NFC) is installed into the Cryptographic Unit (CU) which, in turn, is installed into a Host System (HS). Cryptographic functions on the Host System cannot be executed without a Cryptographic Unit, which itself requires the presence of a valid National Flag Card before it's services are available. For purposes of the discussion herein, the National Flag Card is also referred to as the policy because it provides the discipline that exerts a national cryptography policy and/or that is used to assert a trusted function.

The fourth service element, a Network Security Server (NSS), provides a range of different security services including verification of the other three service elements, and thus acts as a trusted third party. Messages encrypted using the proposed framework carry an electronic stamp identifying the national cryptography policy under which the message was encrypted. The Network Security Server also provides stamp verification services for message handling systems.

The ICF allows manufacturers to comply with varying national laws governing the distribution of cryptographic capabilities. In particular, such a framework makes it possible to ship cryptographic capabilities worldwide in all types of information processing devices (e.g. printers, palmtops).

It is advantageous to define and implement a trusted processing function within the confines of the framework or other processing system. Such function should be based upon various underlying assumptions. Thus, to describe a security model which provides the necessary guidance to the structure, it is first necessary to list the assumptions made about the nature of the framework architecture. These assumptions dictate the nature of the trust model.

Figure 2:
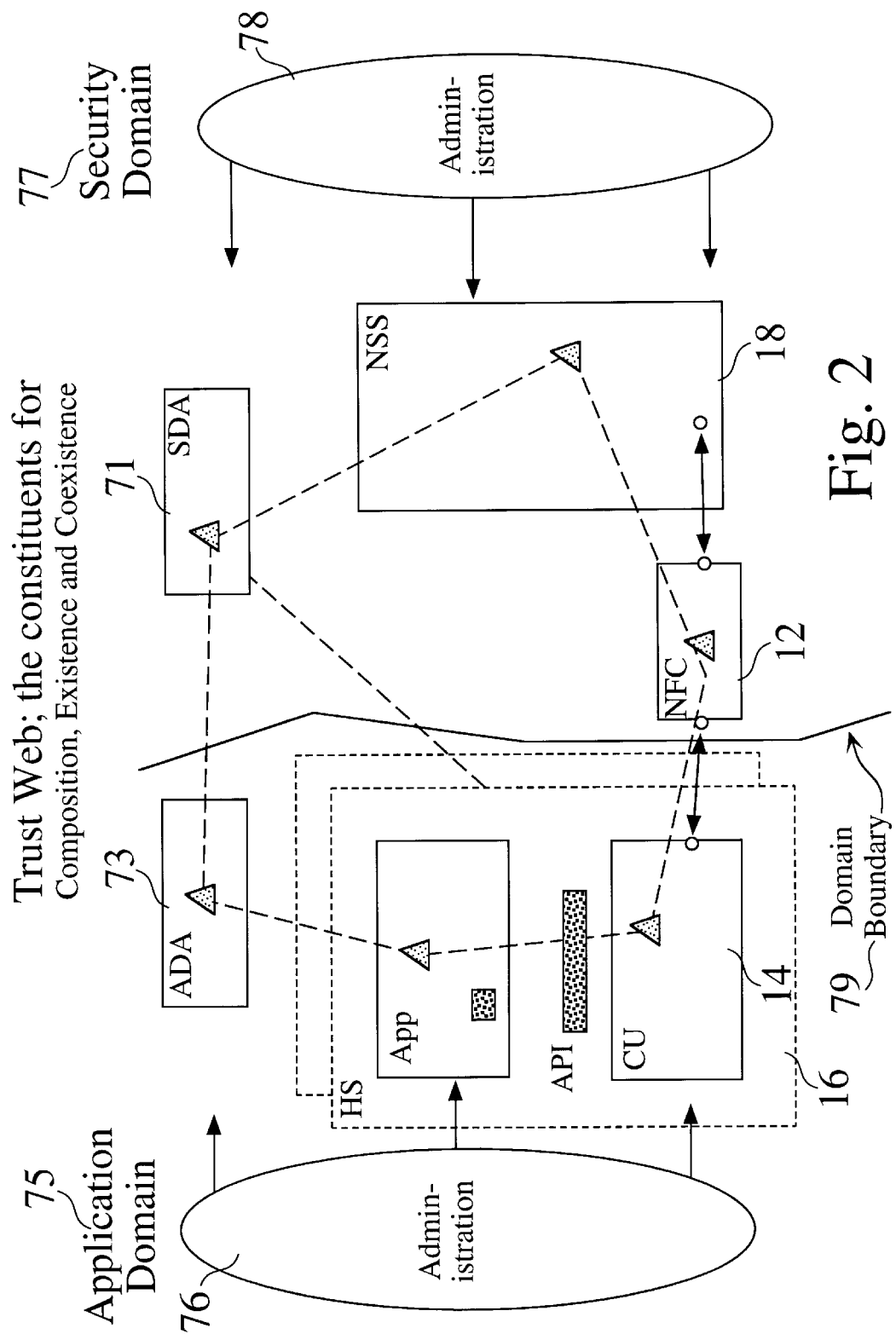
FIG. 2 shows a trust web by which the framework service elements of FIG. 1 are interconnected.

Composition. The framework consists of the four service elements disclosed by K. Klemba, R. Merckling, International Cryptography Framework, in a copending U.S. patent application Ser. No. 08/401,588, which was filed on 8 Mar. 1995, now U.S. Pat. No. 5,651,068, interconnected with a trust web including a security domain authority (SDA) 71 and an application domain authority (ADA) 73, as outlined in FIG. 2. The framework is intimately built into the trust relationship set up between the application domain 75 and the security domain 77, as separated by a domain boundary 79.

Two different trusted elements materialize the active relationship in the trust web: the policy support, and the cryptographic class of service—also referred as the COS. The policy support is a composite element which consists of a trusted element developed in the security domain, a policy (NFC), and a trusted element developed in the application domain, i.e. the cryptographic unit (CU).

Coexistence. The framework coexists with an established network of interconnected physical machines/devices and makes the cryptographic dimension of the existing network tangible. Each machine—host system—is the home for a number of trusted and untrusted applications all requiring access to a cryptographic service. Cryptographic services are made available to the applications under a controlled policy. The policy is determined by the SDA.

Existence state. Once the two trusted elements, i.e. the cryptographic unit and policy, are mutually authenticated and have set up a trust relationship, the policy support combined creates the existence state of the cryptographic mechanisms in the host system.

Roles of the constituents. SDAs generate the policy support which materializes the ruling policy of the domain. The SDA can generate the policy themselves or delegate the right to an accredited entity of the domain—the national security server. They also can generate the policy. The delegation is not an endless delegation chain, but rather a controlled chain with a limited list of entities. Generation of policy support elements occurs in response to requests from an application user who requires the enablement of cryptographic mechanisms.

SDAs also create and revoke the COSes and make them available to their ADAs through the means of a certificate structure.

A cryptographic unit is manufactured by a trusted entity of the application domain. The trusted originator of secret information establishes yet another secure communication channel between the two domains, i.e. ADA to SDA.

Administrative activities 76, 78 complement the trust web by providing the entities from both domains and the inter-domain relationship with consolidated integration functions.

Figure 3:
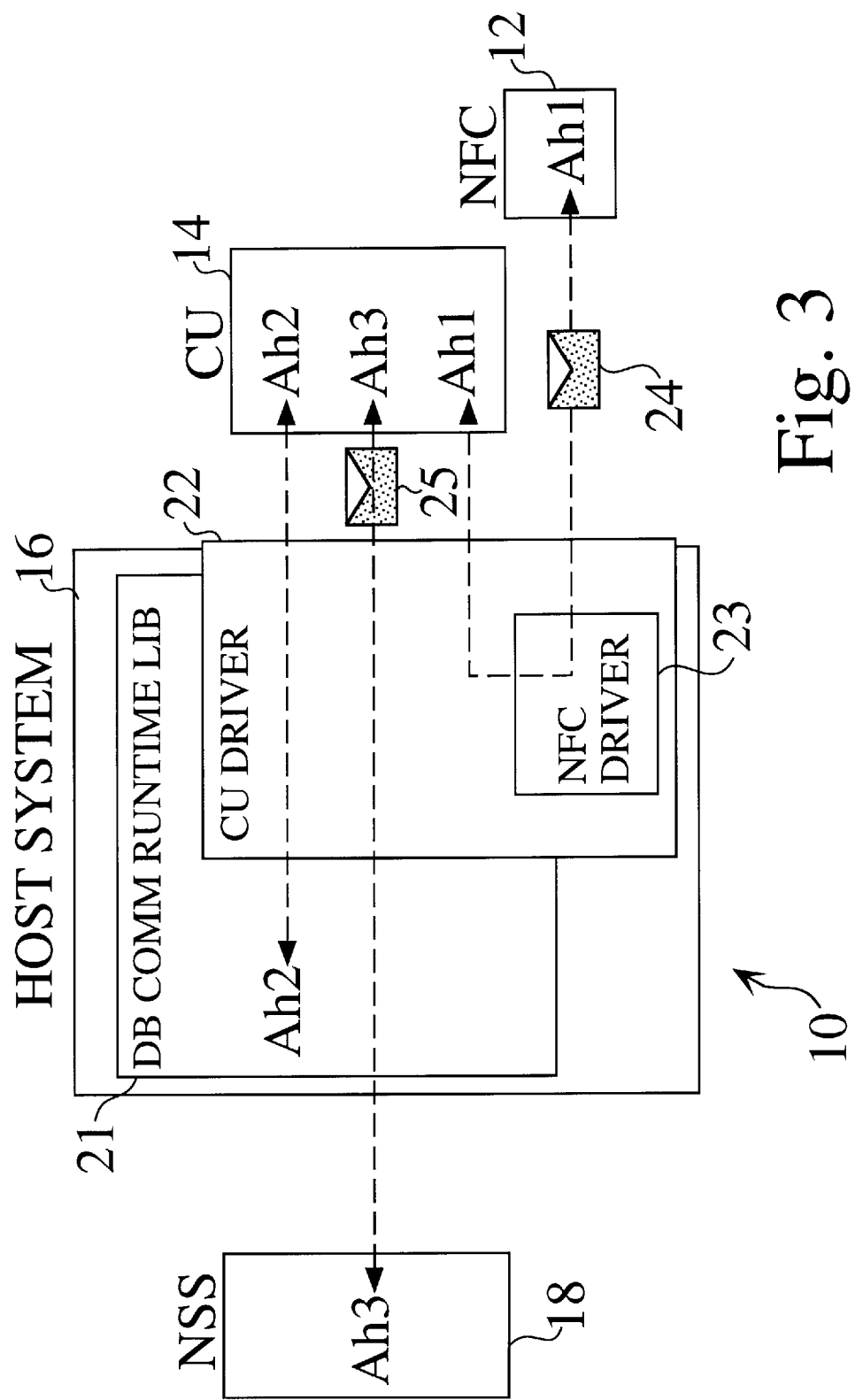
FIG. 3 is a schematic diagram showing the various elements of the international cryptography framework of FIG. 1, including exemplary processes that may incorporate an element of trust in accordance with the invention.

FIG. 3 is a schematic diagram showing the various elements of the international cryptography framework of FIG. 1, including exemplary processes, e.g. DB Comm Runtime Lib 21, CU driver 22, and NFC driver 23, that may incorporate an element of trust in accordance with the invention.

The invention provides a trusted processing element, for example in an international cryptography framework or other trusted processing application. For purposes of the disclosure herein, the element of trust is defined in accordance with ISO/IEC 10081-1, i.e. where element x trusts element y for some classes of activity in the context of a security policy, if and only if element x has confidence that element y behaves in a well-defined way that does not violate the security policy. For example, in the context of FIG. 3, the NFC driver 23 trusts the CU 14, if and only if the CU behaves in accordance with the policy dictated by the NFC 12.

The trusted processing element is implemented in accordance with various principles, including:

Separation—At any level of execution, clean separation of the security functionality from other functionality is employed to minimize the amount of functionality that must be trusted and therefore increase the level of trust that can be achieved. Hence, at one extreme end of the spectrum there is a singular execution of the instruction. Practically, systems or kernel implementations refer to an atomic execution element as a single task or thread. This principle leads to confidentiality in a system, but the separation principle is not considered sufficient to fulfill integrity in most applications.

Locality—Any part of a system that is permitted to process information is able to corrupt that information.

Therefore, preserving the integrity of the information depends on the level of trust of the constituent parts of the system that handle the information. As an application of the first principle, the trusted processing capability of a cryptographic unit, as controlled by a policy card, becomes a trusted execution area where critical applications transform sensitive information. Such information uses protected mechanisms, i.e. envelopes 24, 25, to leave the trusted execution area or to join the user level task before local execution by the cryptographic unit.

Within the trusted processing element (for example, as applied to a cryptographic unit 14), the main CPU participates in processing trusted partitions that are controlled by the policy 12.

Fundamental properties of the trusted processing element include:

Encapsulated single tasks;

Use of closely coupled, reconfigurable kernel components; and

Execution of adaptation policies in a secure vault to prevent unauthorized uses of privileges.

Thus, the trusted processing element provides a trust controlled processor, such that system/application processing proceeds in a trusted fashion.

It is a fundamental requirement of the International Cryptography Framework that a policy card—under any form factor, physical or logical—be present for a cryptographic unit to become functional. The International Cryptography Framework was designed to allow manufacturers to comply with varying national laws governing the distribution of cryptographic capabilities.

Basic Architecture Assumptions.

Code prepared for execution by a cryptographic unit cannot be executed anywhere else;

Code prepared for execution by a cryptographic unit cannot be modified;

Code prepared for execution by a cryptographic unit cannot be seen in the clear;

Execution of code in the cryptographic unit cannot be preempted; and

Data manipulated by the cryptographic unit is executed locally.

A policy governs the trusted processing—physical/logical retrieval of the policy decays the trusted processing.

The problem of composition.

The problem of composition is concerned with the kinds of relations that trusted elements can bear to one another in systems, including the security relevant properties of trusted elements when in such relations and the inference that can be drawn about the security relevant properties of the composed system from the security relevant properties of the constituent elements. To be composable, trusted elements require some properties be arranged into secure systems, especially where standardized properties make the implementation of trusted elements an easy task.

Figure 4:
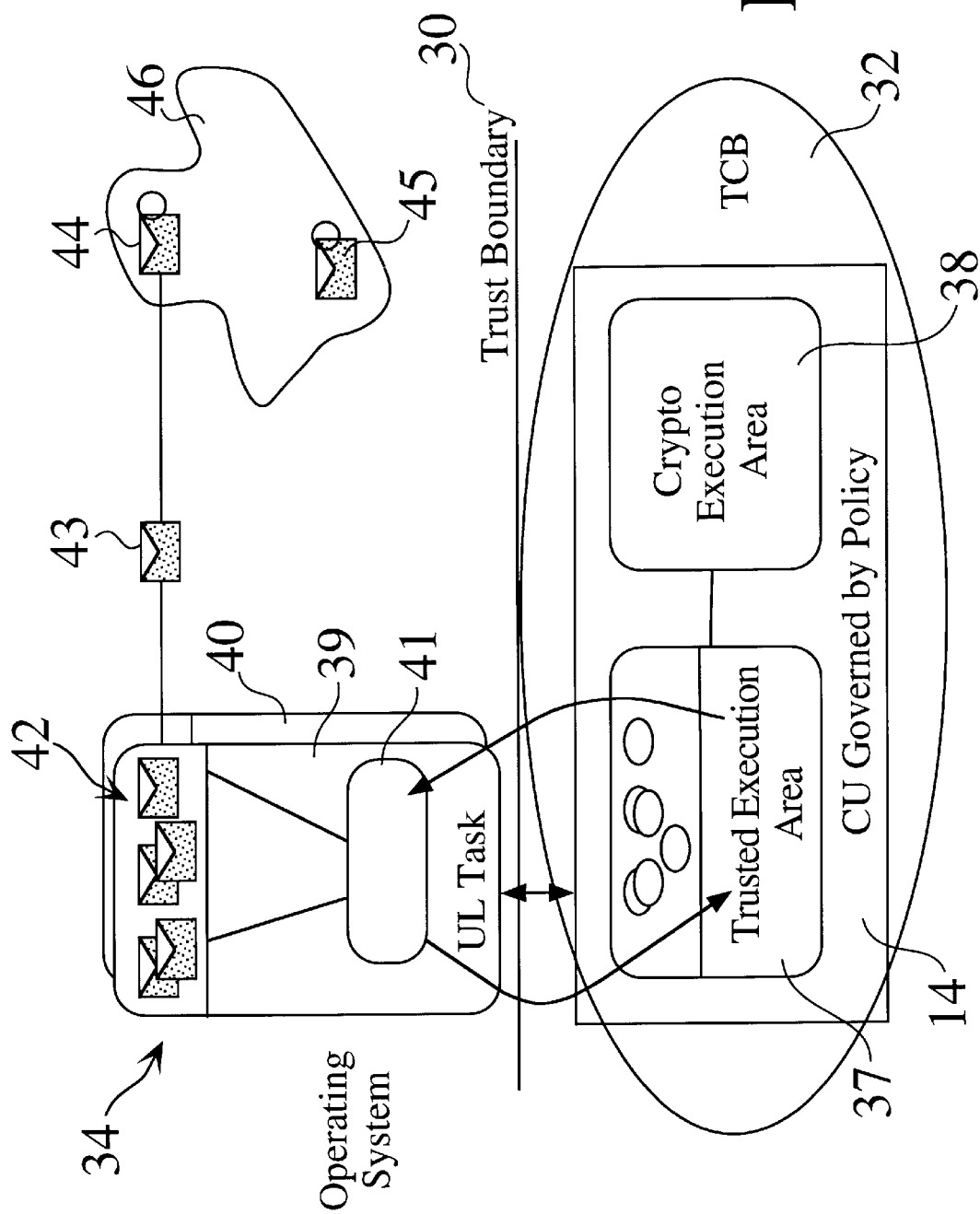
FIG. 4 is a schematic diagram showing a trust boundary, as established between an operating system and a trusted computing base, according to the invention.

FIG. 4 is a schematic diagram showing a trust boundary, as established between an operating system and a trusted computing base, according to the invention. In the figure, the trust boundary 30 separates the operating system 34 from a trusted computing base 32. In this example, the trusted computing base contains a cryptographic unit 14 that is governed by a policy (not shown) in accordance with the international cryptographic framework described above. The cryptographic unit includes a crypto execution area 38 that performs cryptographic functions (for example, as described in U.S. patent application Cryptographic Unit Touch Point Logic, Ser. No. 08/685,076, filed Jul. 23, 1996) now U.S. Pat. No. 5,710,814.

The cryptographic unit also includes a trusted execution area 37 that is responsible for performing trusted processing. As discussed above, trusted execution occurs in accordance with certain basic architectural assumptions, e.g. the cryptographic unit is controlled by a trusted element, such as the policy. The trusted execution area is typically a replica of an application module belonging to a host or external device token, or a system process being executed in a trusted computing base. The only difference is the controlled access to data and instructions due to a very tight connection to the policy. Because trusted processing as herein defined is a simple process, it is a non-interruptable task that has a single assignment to the process or CPU. Thus, it is not possible to replace the existing process, because that specific function of changing or switching context is under control of the trusted element, i.e. the policy monitor.

The operating system typically executes various applications 39, 40, each of which includes one or more processes or tasks 41. Each application typically includes various partitions 42, each of which uses protected mechanisms, i.e. envelopes 43, 44, 45, to leave the trusted execution area, e.g. to use remote processes 46, or to join the user level task 41 before local execution by the cryptographic unit.

The envelopes are an encrypted/signed bulk of data which may use any of various known standards. For example, in one embodiment of the invention an envelope employs the X/OPEN defined generic cryptographic services (GCS) encryption data structure belonging to an encryption handle, i.e. an application certificate credential is setup during the initial secure association, e.g. create_CC. The specific handle is a session key that is encrypted with an application private key to ensure secure export/import/storage when it is not used in the trusted environment.

The cryptographic unit may include such components as software, virtual memory, and a CPU. It is therefore possible for the cryptographic unit to store application programs in memory and page them over to a trusted computing base for trusted execution. Such applications include various trusted modules (discussed in greater detail below), each of which typically has a signature assigned to it. Thus, the module has some binding to the task by itself, but specifically it has a signature assigned to it, which makes it unique and verifiable in terms of authenticity and integrity. In contrast, a branching mechanism is no more than a standard control structure or control function without any verification of integrity of the next instruction. The invention provides a trusted element that prepares, as an example, some of the core components of a kernel, to make its behavior very specific. The prior art is not adaptive and cannot be reconfigured. Thus, the invention may be thought of as providing a trusted element that preconditions the application or the operating system to operate in a certain way in accordance with what the policy dictates.

With the invention, it always is the case that trust lies in the boundaries of the trusted computing base, on one side of the trust boundary. As discussed in K. Klemba, R. Merckling, International Cryptography Framework, in a copending U.S. patent application Ser. No. 08/401,588, which was filed on 8 Mar. 1995, now U.S. Pat. No. 5,657, 068, it is not possible to enter or modify a region that is secured by a policy. In the invention, the policy/cryptographic unit metaphor is used to establish a trust boundary within a process, such that trusted elements are used to control execution of a task or process within an application. Any attempt to stop or get rid of the pages from the application to the trusted computing base is detected by the trusted computing base and thereby disables (more accurately—deletes) any functionality afforded by the trusted element.

Thus, the operating system 34, e.g. MacOS, Windows, or Lotus Notes, may include a section of code across the trust boundary in the trusted execution area 37, for example accounting code that charges a user for access to this system. In such applications, it is critical that this piece of code be executed.

Implicit in the system is a trusted element, such as the policy discussed above in connection with the International Cryptography Framework. If the policy is removed the application could still run, but it cannot make use of the properties provided by a trusted engine. In the accounting example above, the accounting function would not run, with the result that access would not be allowed.

In a system where cryptography is used, such as is shown in FIG. 4 in connection with the crypto execution area 38, the application may not be allowed to use cryptography in the absence of a policy, i.e. the trusted element. Thus, the application can run, but it cannot use cryptography. In this example, a cryptographic unit could be freely exported without regard to local laws regarding cryptography, but the cryptography could only be accessed in accordance with local laws when a policy is installed, i.e. when the trusted element is present.

Figure 5:
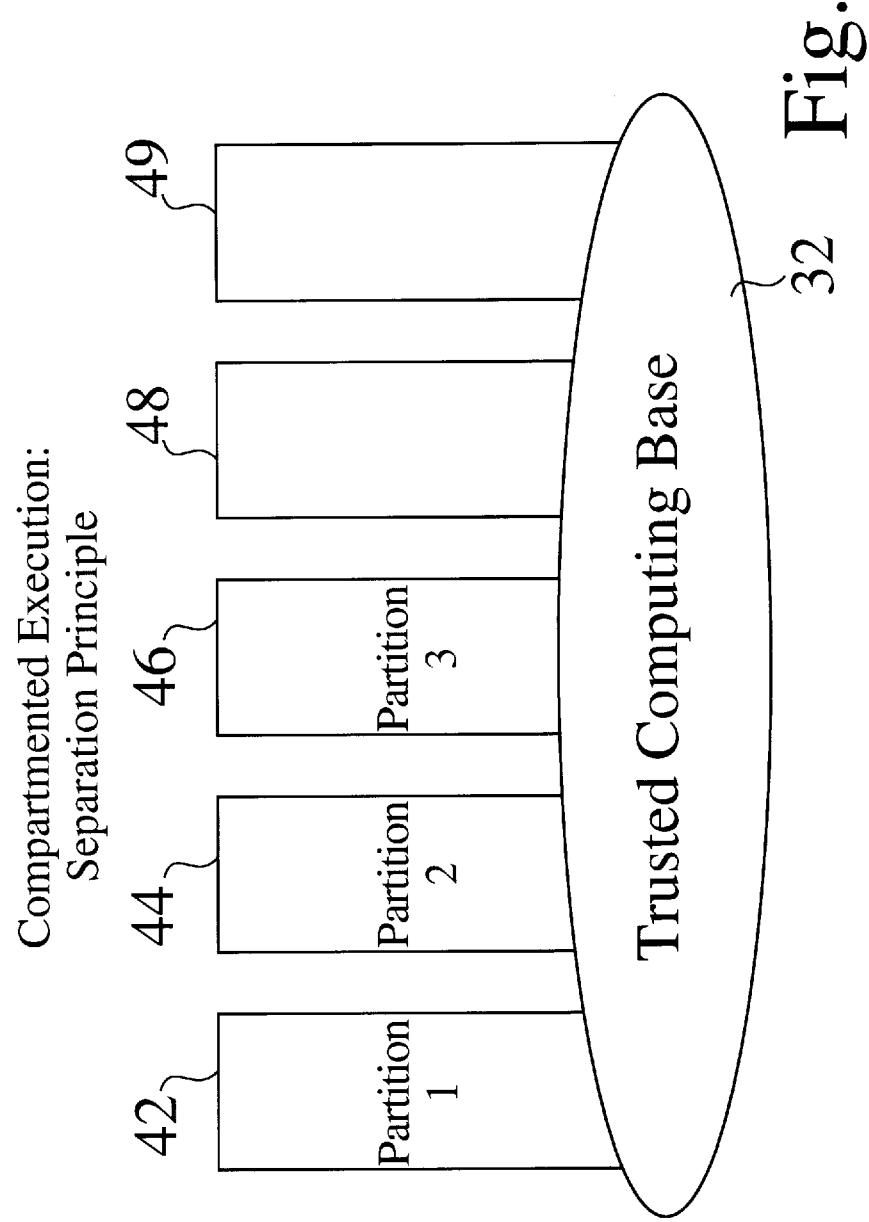
FIG. 5 is a schematic diagram that shows a compartmented execution to illustrate a separation principle according to the invention.

FIG. 5 is a schematic diagram that shows a compartmented execution to illustrate a separation principle according to the invention. As discussed above, separation requires that at any level of execution, clean separation of the security functionality from other functionality is employed to minimize the amount of functionality that must be trusted and therefore increase the level of trust that can be achieved. In the figure, the trusted computing base 32 is shown with a plurality of partitions 42, 44, 46, 48, 49, where each partition defines a process or task that must access the trusted computing base to assert an element of trust during execution of the process or task. By compartmentalizing execution into a plurality of partitions, each of which requires confirmation beyond the trust boundary, the trust function is separated from process or task execution, such that execution of an application proceeds outside of the trust boundary, except for those partitions that assert trust, which are separated from, but which assert trust for, the application (see FIG. 3).

Figure 6:
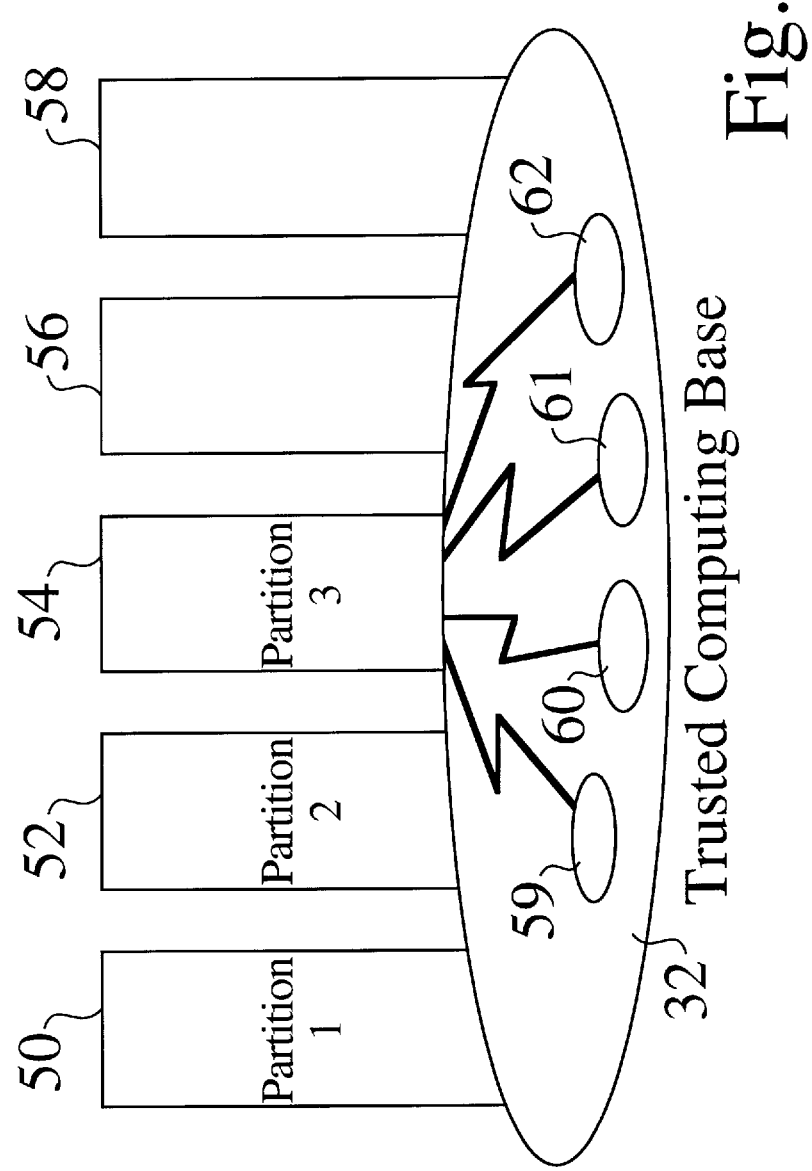
FIG. 6 is a schematic diagram the shows a local execution of sensitive information to illustrate a locality principle according to the invention.

FIG. 6 is a schematic diagram that shows a local execution of sensitive information to illustrate a locality principle according to the invention. As discussed above, any part of a system that is permitted to process information is able to corrupt that information. Thus, the trusted computing base must be secured. Therefore, preserving the integrity of the information depends on the level of trust of the constituent parts of the system that handle the information. By definition, the trusted processing capability of a cryptographic unit, as controlled by a policy card, becomes a trusted execution area, i.e. the trusted computing base 32, where critical applications 59, 60, 61, 62 transform sensitive information. Thus, locality requires that trusted functions be executed exclusively in the trusted execution area.

The trusted processor allows the policy to provide different levels of privileges for various system users. Thus, a particular system responds to user access with different levels of privilege, based upon the particular policy, i.e. the level of trust is dictated by the policy. A supervisor might have greater privileges than a clerk, and the owner of the company might have better privileges than the supervisor. The invention thus provides a trusted element that determines, for example, the security of an accounting function based on the policy, i.e. more authority requires less security and vice versa.

A critical element of the invention is that the system has physically separated the engine and the trusted element, for example because it is desirable in some embodiments to be able to ship the cryptographic unit internationally without export controls. As the cryptographic unit passes a border, it is not really a cryptographic unit because there is no way to make it work as a cryptographic unit until a user inserts a policy card. Thus, the cryptographic units are readily shipped across international borders because they do not contain cryptography when they cross an international border.

It should be borne in mind that the invention exploits this arrangement to advantage in other systems where a separate element of trust is required and that the example given herein of the International Cryptography Framework and its constituent components is only provided for purposes of illustration. For example, one embodiment of the invention combines both a cryptographic policy and privilege/identification data. When the trusted element, e.g. the policy, is joined to the cryptographic unit or other engine having the ability to access a trusted execution area, the cryptography within the cryptographic unit is activated in accordance with the policy and the user/privileges is identified to the system. As soon as the policy is removed, not only has the user logged out of the system, but the cryptographic function is also gone. If somebody else accesses the system and tries to use it, it is not going to do them any good because the cryptographic function is not working.

The invention is thus useful for such entities as the national governments. For example, a government employee may be allowed to use a certain method that others are not allowed to use. As a consequence, it is not desirable to leave that method activated inside the cryptographic unit when the privileged user leaves. If the next user is not a government employee, then the method is not in the system. It is well known how to falsify authentication information. When practicing the invention, it is not sufficient to determine only if the user is a government employee before the classified method is activated. When the policy is inserted, the trusted element requires a continuing "conversation" between the task or process that cannot be duplicated because it is specific to the policy. Thus, falsification of an user identity does not enable an application, for example where there are multiple partitions, each of which requires access to the trusted element.

It should be noted that the policy may be joined to the cryptographic unit in any of a number of ways. For example, they may be joined physically at a single location, or they may be joined electronically over a secure communications line.

Analysis of the Flow of Control.

Envelopes are already the trusted shuttle as well as a corner stone of the encryption building block, providing the vital gate enabling information to the touch points. Similarly, the envelopes transfer trusted execution information to the policy monitor. The flow of control for the installation of the trusted processing policy is best understood by referring to the description of the cryptographic unit behavior set forth in U.S. patent application Cryptographic Unit Touch Point Logic, Ser. No. 08/685,076, filed Jul. 23, 1996) now U.S. Pat. No. 5,710,814, and by K. Klemba, R. Merckling, International Cryptography Framework, in a copending U.S. patent application Ser. No. 08/401,588, which was filed on 8 Mar. 1995 now U.S. Pat. No. 5,657,068.

Figure 7:
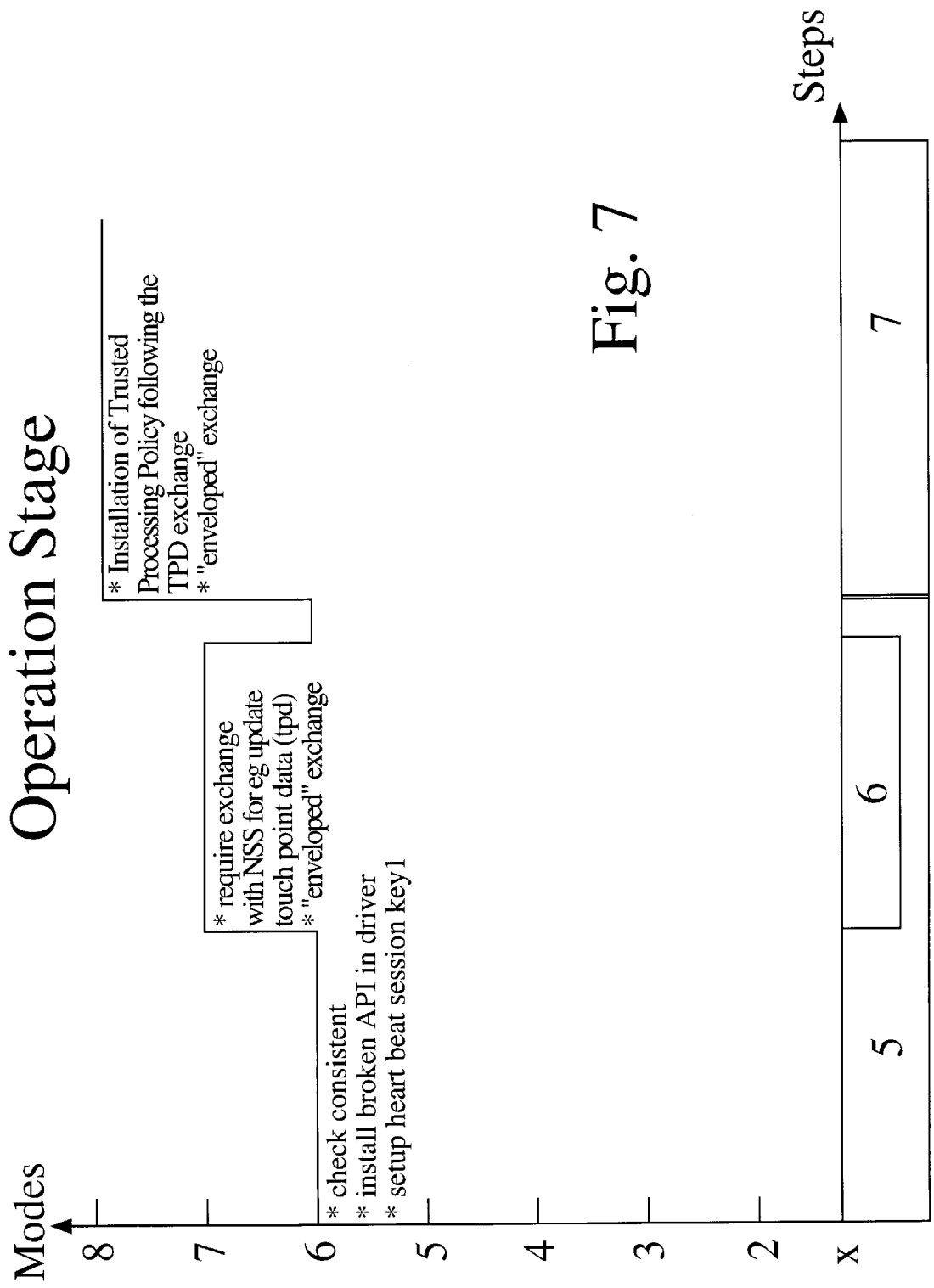
FIG. 7 is a timing diagram showing behavior of a cryptographic unit during an operation stage according to the invention.

FIG. 7 is a timing diagram showing behavior of a cryptographic unit during an operation stage according to the invention. For purposes of the invention herein, the cryptographic unit behavior is modified as follows:

The cryptographic unit evolves to Step 7 (see, also FIG. 4, U.S. patent application Cryptographic Unit Touch Point Logic, Ser. No. 08/685,076, filed Jul. 23, 1996) now U.S. Pat. No. 5,710,814 after a first successful heartbeat of the last installed encryption method. To consolidate the state, the cryptographic unit also changes the mode to Mode 8. In Mode 8, both the policy controlled trusted processing and the policy controlled encryption mechanisms are enabled. It should be noted that trusted processing can only happen while the controlled encryption is enabled. Conversely, as an example, the cryptographic unit may stay in Step 7 Mode 6 during one lifetime and yet switch to Mode 8 to enable trusted execution in another lifetime. For purposes of the discussion herein, a lifetime is defined as the life execution of a cryptographic engine on one host system. As discussed below, Step 7—Mode 8 summarizes the time for installation of policies for trusted processing. A logical sequence number #i is suggested to support the discourse.

Example of use: Certified Load.

Figure 8:
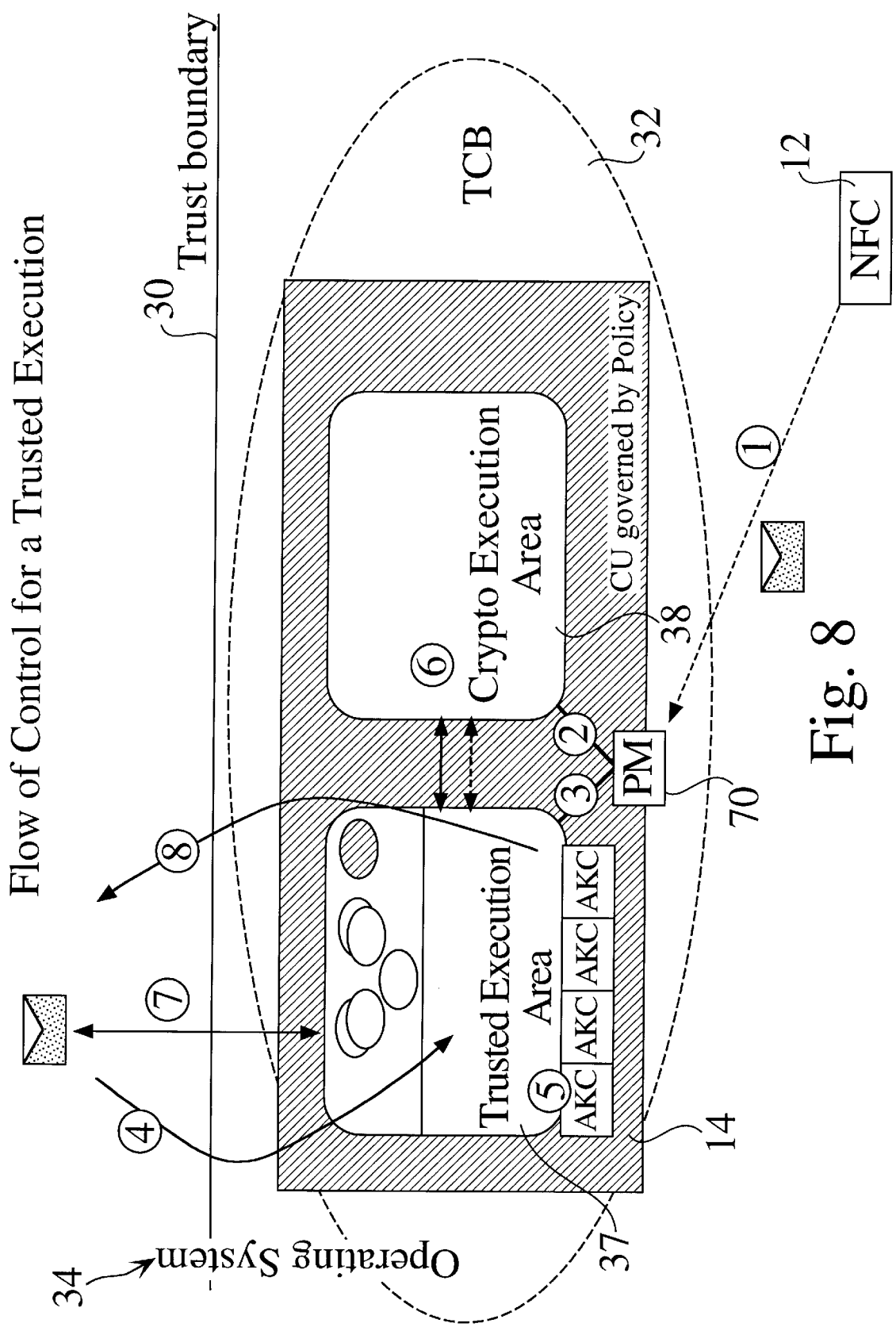
FIG. 8 is a schematic diagram showing the flow of control for a trusted execution according to the invention.

The following example is shown on FIG. 8, which is a schematic diagram showing the flow of control for a trusted execution according to the invention. This example shows an embodiment of the invention that provides trusted processing in the international cryptography framework discussed above. It should be appreciated that the following is provided only as an example of a preferred embodiment of the invention and that the invention is not limited to this particular embodiment. On the figure, each of the following steps is shown by a corresponding numeral within a circle.

Step #1: The trusted communication is established between the policy monitor 70 and the policy 12, i.e. two phases of the challenge/response for the cryptographic unit identification and the zero-knowledge exchange for the session key setup have been terminated successfully.

Step #2: The policy monitor 70 has redirected the touch point data through the loader function (see U.S. patent application Cryptographic Unit Touch Point Logic, Ser. No. 08/685,076, filed Jul. 23, 1996) now U.S. Pat. No. 5,710,814. The installation of the touch point data for the last mechanism has concluded the dialog with a successful heartbeat.

Step #3: The header of the exchange envelope from the policy 12 to the cryptographic unit/policy monitor identifies the next contents of the envelope as a trusted execution credential.

The following envelope content structure applies:
adaptive kernel identifier (AKC1);
the privilege level which should be used to execute the referred COSp; and
the system granted role(s) associated with such an application.

Multiple iterations of envelopes may be necessary to install all the trusted AKCs.

Step #4: An application credential is presented through the API with a certified Step credential.

Step #5: The trusted adaptive kernel constituent is launched by message passing, thereby enforcing a specific privilege level.

Step #6: Various subAKCs are requesting some decryption of keying material, executed locally.

Step #7: A specific bulk of data is referred during the execution of the application, requiring the use of some registered import/export mechanism.

Step #8: The application execution concludes with a successful encapsulation of some keying information to be retrieved in a further invocation.

Hardware protected space.

Figure 9:
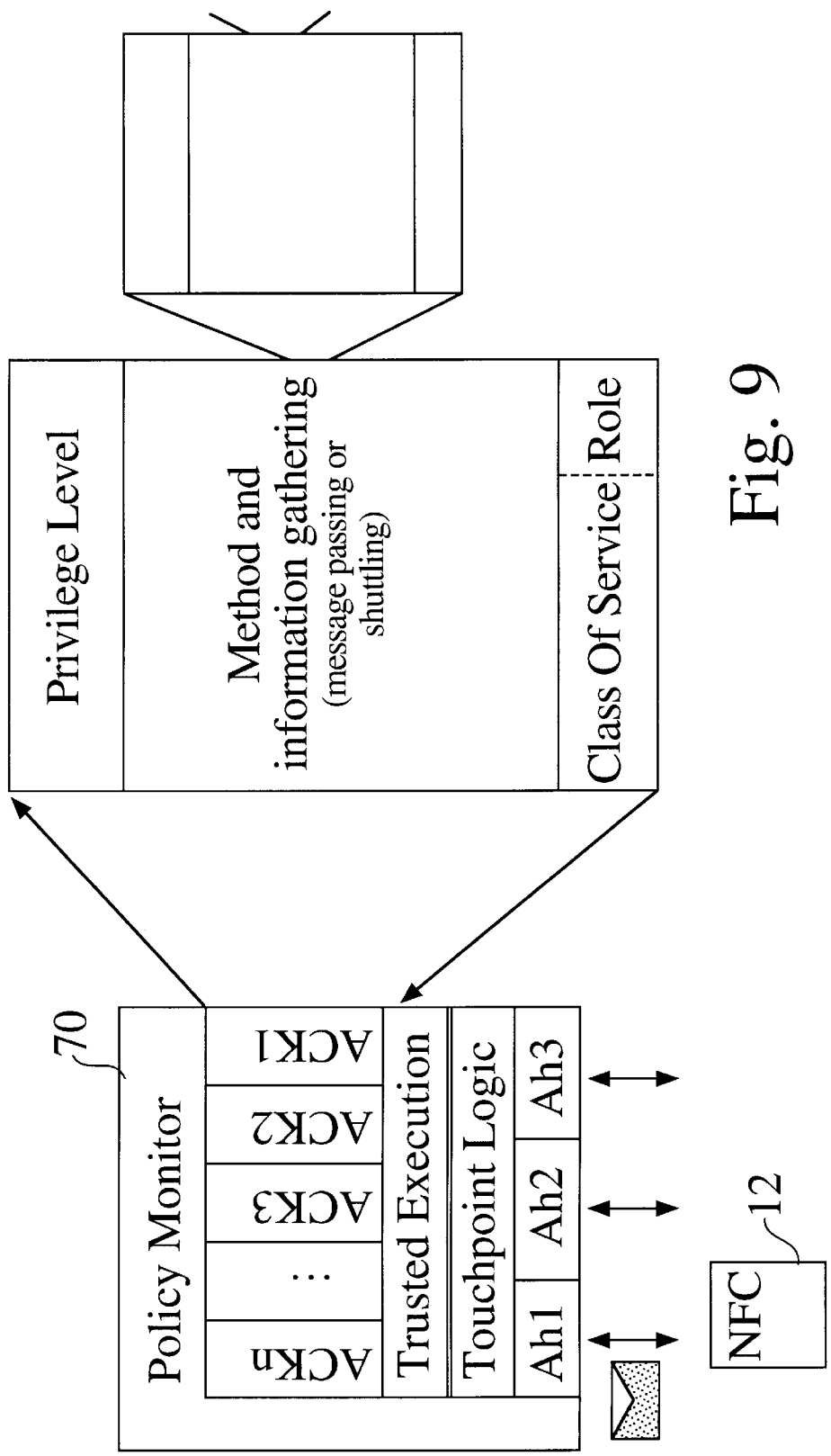
FIG. 9 is a schematic diagram showing local execution of an adaptive kernel constituent according to the invention.

FIG. 9 is a schematic diagram showing local execution of an adaptive kernel constituent. In the figure, a trusted processing CPU is governed by adaptive processing policies for the kernel constituents. Similarly, such constituents require invocation of subconstituents. This is shown on FIG. 8 for AKC1, which includes a privilege level, a method and information gathering (which may involve message passing or shuttling), a class of service granted by the ADA, and a role. The mechanism of the embodiment shown on FIG. 9 is similar to that described above in connection with FIG. 8.

Execution of adaptation policies for adaptive kernels.

New generations of kernels provide specific support for adaptability, configurability of their basic components, and the supply of required dedicated run-time behaviors to critical applications, collectively referred to herein as personalities. Applications use various kernel resources, e.g. scheduling components, synchronization components, threads, memory handlers, exception handlers, and interrupts. Earlier research has demonstrated that heavy transactions applications, as well as parallel applications, often require dynamic process migration and load balancing. To meet the fundamental properties required for such resource management, components of constituent products require standard interfaces, data formats, and protocols.

Kernels provide resources to applications such as the scheduling components, synchronization components, memory handlers, and exception handlers. All of these components define a specific real run-time behavior for an application. One aspect of the invention (discussed above) defines personalities per application which are in fact a translation of a policy. A policy installed in the cryptographic unit can constrain the personality of an application, such that an application acts a certain way based upon the policy.

For example, the policy can constrain the personality of the cryptographic unit by configuring synchronization mechanisms, interrupts, and exception handling, to either facilitate or prevent an application's use of privileged modes of operation. If the operating system has a kernel function, e.g. a print module, then a print process may be inhibited by the policy, i.e. the user can look at certain information but the information cannot be printed. Likewise, the policy can deny the user access to a server. With regard to FIGS. 5 and 6, one of the partitions might be in the print driver, such that the print driver must access the trusted computing base to execute. Thus, if the policy denies printing capability, then the print driver is not executed.

Figure 10:
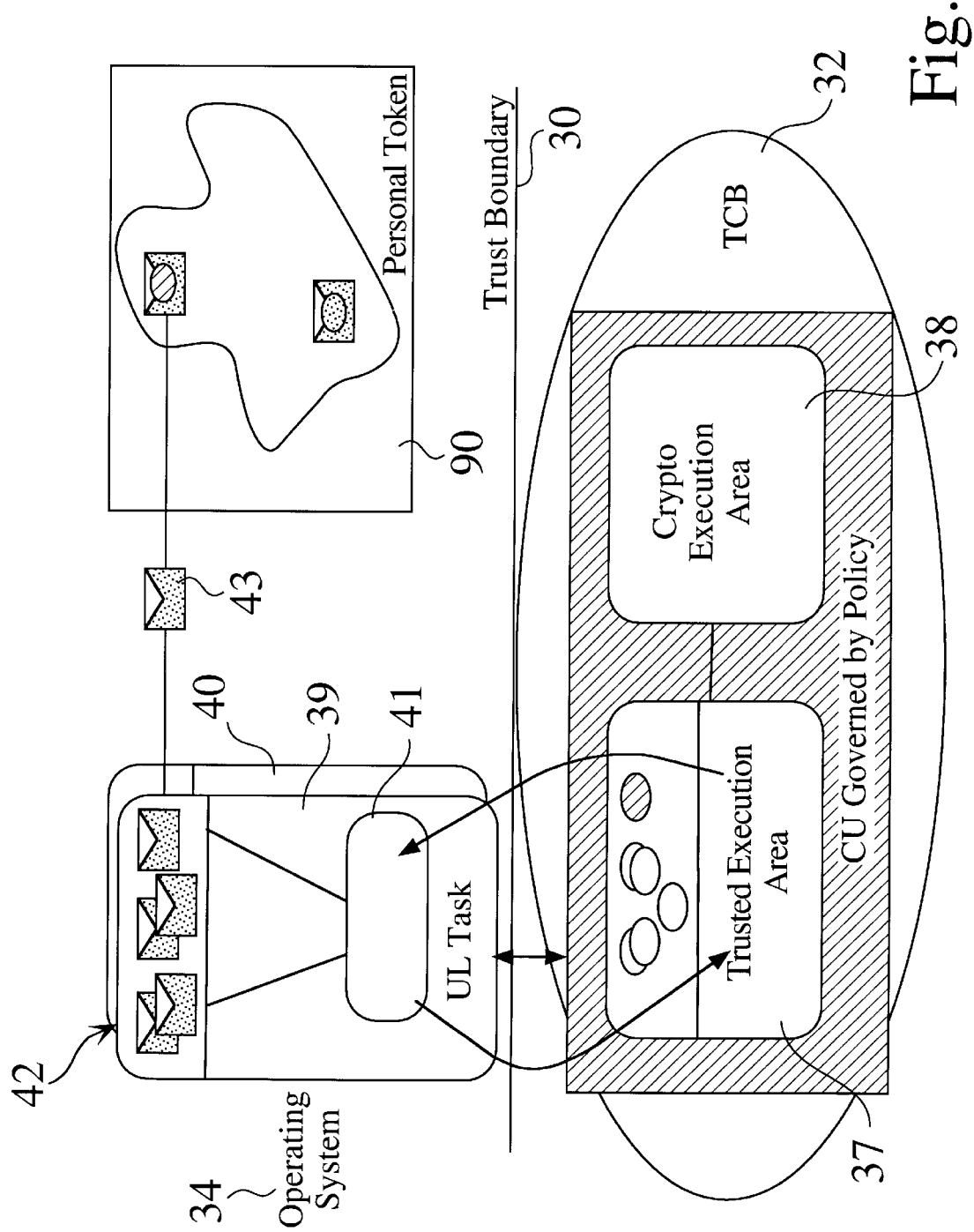
FIG. 10 represents a positioning of a personal token in the context of trusted processing according to the invention.

The following provides an example of an application of the secure distributed processing capabilities for a personal token (see FIG. 10). This example introduces the concepts of accessing personal tokens 90, such as smart cards. Smart cards gain more and more importance in a wide range of industry sectors. While being designed for keeping simple and small amounts of information securely, greater capacities of data storage and better methods of accessing that storage are required for applications to fully take advantage of the personal token.

The key challenges are the limited capacity of the personal token, which leads to a trade-off in functionality versus capacity. Alternatives can been sen in distributing the processing elements across the trust web using the adaptive kernel constituent (AKC) model as developed earlier.

The following describes a method for implementing a higher level structured access method, such as SQL, or invocation methods such as applets, for very small environments. It develops a framework which allows the secure distributed processing between the personal token and the cryptographic unit installed in the host system.

Three major scenarios can be defined from the principles of separation and locality introduced above:

Scenario 1 is a special execution policy for a storage manager.

Scenario 2 is the use of the eight steps decomposition (discussed above) where the target application is an applet.

Scenario 3 is the explicit separation of data and method, where the data resides in the personal token, and where the execution method belongs to the trusted processing in the cryptographic unit.

Because scenario 2 has already been discussed above in connection with FIG. 8, no other extensions are requested.

Scenario 1 requires an additional introduction. Three major building blocks are part of the solution.

Application. The application is the element that connects to the personal token to access stored information. The application needs to establish a mutual authentication with the token to assure the authenticity of the date exchanged.

Access Method Manager. The access method manager provides a high level abstraction, such as the SQL language, to the application. All requests coming from the application are expressed in this higher level access method.

Figure 11:
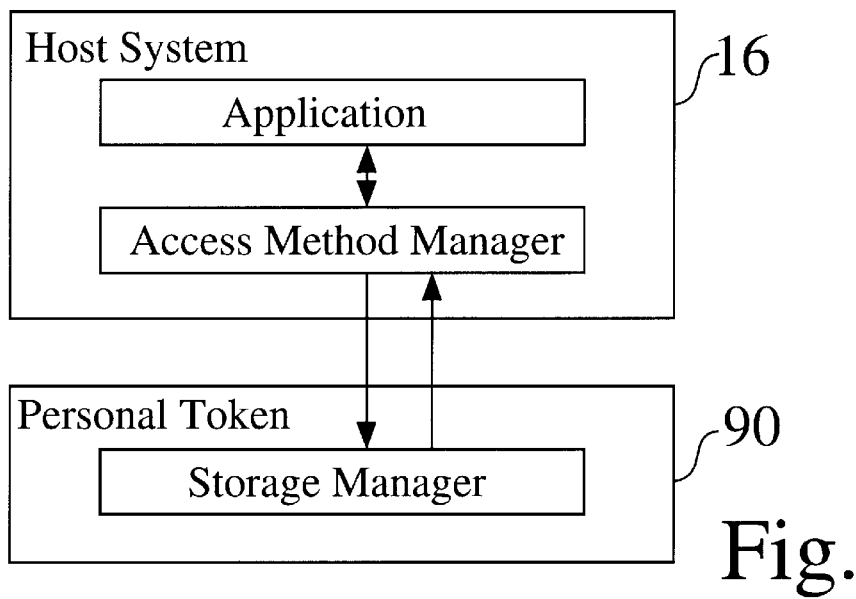
FIG. 11 is a schematic diagram showing the internal structure of a personal token and its relationship with a special trusted execution, i.e. the access method manager, according to the invention.

Specific access policies can be installed into the policy manager block, shown on FIG. 11, which help enforce the only use of SQL command classes (e.g. DELETE USER, CREATE KEY, and UNLOCK) for a specific administration application where the user has a role of administrator. To be specific, the AKC_invocation field allows the execution of command classes delete_user, create_key, and unlock. No COS field is assigned to it if no encryption of data is required.

Storage Manager. The storage manager is the element that is implemented inside the personal token. The main responsibility of the storage manager is to manage the information stored within the personal token.

The same principle applies to the control of the movance of encrypted data, including their transfer, conversion, replication, and encrypted storage. The application with AKC_invocation field allows specific movance functions with a COS field set to encrypted storage.

Figure 12:
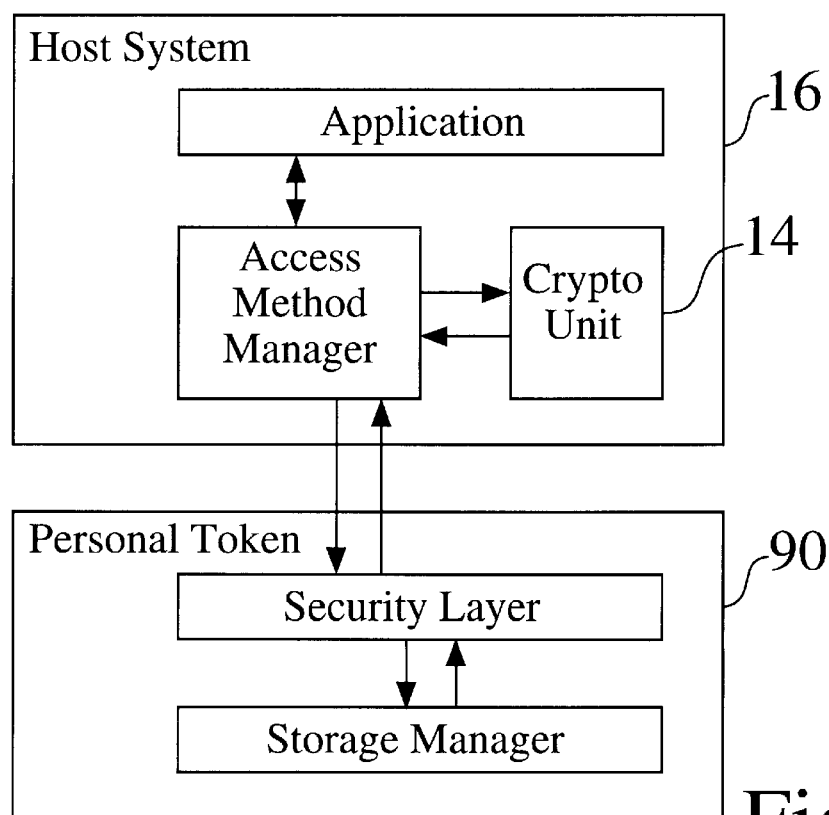
FIG. 12 represents the use of security controls, i.e. security privilege execution, in the context of a personal token and trusted processing according to the invention.

Scenario 3, which is represented by FIG. 12, has another building block: the security layer.

In the traditional approach, where every component exists inside the personal token, the security boundary is at the access method level. The invention provides a method and apparatus that breaks with this division by introducing a security boundary that is at a lower level. As a consequence, sensitive structural information must be exchanged between the access method manager in the host system and the storage manager in the personal token.

All message traffic between the personal token and the access manager must be exchanged in encrypted form, e.g. the envelopes. Cryptographic services must be available on each side of the connection. FIG. 12 shows a system that uses a cryptographic unit on the host system and the cryptographic services implemented in the personal token for this purpose.

During connection time, both parties need to authenticate each other. the access manager must have the structural information before it can build an access request. The access method manager sends a request to the personal token to establish the connection. The personal token replies with a challenge and the structural information needed by the access method manager to build a request for the storage manager.

After the download of data and structural information from the personal token to the execution zone, using the envelopes, the trusted processing can engage privilege instructions as specified in the access method manager application. This scenario uses the AKC_privilege field to control the execution of proper action on the data loaded through envelopes.

Key to the invention is the fact that the trust boundary cannot be breached. While this boundary can be physical, electrical, or logical, the trusted element, i.e. the policy, establishes the trust boundary by providing a hardware element that cannot be duplicated because of the manner in which it is manufactured and personalized. While the trusted element can be any of several secure devices or techniques, the preferred embodiment of the invention exploits to advantage the properties provided by the policy described in K. Klemba, R. Merckling, International Cryptography Framework, in a copending U.S. patent application Ser. No. 08/401,588, which was filed on 8 Mar. 1995 now U.S. Pat. No. 5,651,068.

Some of the applications to which the invention may be put include, trusted login audit execution, creation of audit-logs, trusted configuration management, networking and system infrastructure, application management, security authority management, application authority management, policy cards management, and consumer cards, e.g. personal tokens.

Decay Function

Each of the messages sent between the cryptographic unit and the policy is encrypted using a key that is constantly changing. This allows the system to create a progression that cannot be interfered with because the key is always changing. The value $k_i$ (where $k_i$ is one of the messages) is equal to a function of the session sequence number (RN). These messages began with a random point, e.g. 1010, which is a random number that was the first sequence number sent between the policy and the cryptographic unit. The policy sends a response to the cryptographic unit which increments the number, i.e. 1011. The system continues sequencing from this random point. The function of the value $k_i$ is a function of that random number and k, where k is determined during the initialization phase (as discussed above) and is a unique key that the policy and cryptographic unit now both share.

To know the key at any point $k_i$, or to predict that key, it is necessary to know the serial number of the message, RN, and k, the original number. Additionally, the function has a decay value. For example, suppose the policy and cryptographic unit have been in communication for quite a while and are up to the number 2084, i.e. the value of RN. Where an interloper has captured a lot of the messages and wants to come back and get the first message, if the value substituted is more than a delta of 10 away from the actual number, the function does not work. Thus, $k_i$ is only valid when RN is less than or equal to 10 from RN.

With the decay function, the policy and cryptographic unit may be passing a message of any type that is encrypted using $k_i$. It may be possible with a brute force attack on one message to go off and work for five days and break one message to get $k_i$. However, that was what the key was two days ago. Knowledge of that key and even knowledge of this function cannot be reversed to identify the value of k. Even if k and $k_i$ are known, the value calculated is more than 10 off from current value.

A value such as 10 is chosen in the preferred embodiment of the invention because a legitimate system could fall out of synch by a jitter due to, for example a power failure or if someone snaps the policy out just before they were able to update the number in their static RAM. Suddenly the system is powered back on, but the system never goes back to zero again. When the is powered back on, it is expected that the system starts off with $k_i$. However, that value could be off, so the number is modifiable in the algorithm, e.g. by 10.

An important aspect of the invention is that the system trusts the policy, but does not really trust the cryptographic unit. Every now and then the policy may change the sequence number. Thus, the policy may normally increment the sequence number one by one by one, and then every now and then it issues another random number. When it does that, the cryptographic unit receives the number in the message because the message would have been encrypted using $k_i$, which synchronizes the system. When suddenly the other side sees the sequence number jump, the message received is valid because it was in the stream, it was encrypted with the right next key, only the sequence number is taking a jump. The cryptographic unit follows that jump because its about to send a message back to the policy. So, the system intentionally jump over the decay value, e.g. 10, periodically just in case the value was decrypted before the tenth message. This jump only comes from the policy. A cryptographic unit knows that from time to time there is going to be a jump, but if the policy ever sees a jump it is going to work. Further, the interval for the jump can be totally random and the amount of jump can be up or down or any which way.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

We claim:

1. A trusted processor, comprising:
   a process that executes a task within a system, said process having one or more partitions that define trusted modules;
   a trust boundary established by a trusted element; and
   a trusted computing base, including a trusted execution area;
   wherein said trusted computing base is separated from said process by said trust boundary, and wherein each of said trusted modules separately access said trusted computing base and are each executed locally within said trusted execution area.

2. The trusted processor of claim 1, said trusted element comprising:
   a policy.

3. The trusted processor of claim 2, wherein said policy implements a processor personality.

4. The trusted processor of claim 3, wherein said personality defines a level of trust and/or privilege to be afforded a user of said trusted processor.

5. The trusted processor of claim 1, further comprising:
   a envelope for conveying information across said trust boundary.

6. The trusted processor of claim 1, further comprising:
   a cryptographic unit; and
   a policy;
   wherein said cryptographic unit is controlled by said policy, said policy comprising said trusted element.

7. The trusted processor of claim 1, said trust boundary comprising:
   a physical, electrical, and/or logical barrier.

8. The trusted processor of claim 1, said trusted element comprising:
   a hardware element that cannot be duplicated because of the manner in which it is manufactured and/or personalized.

9. The trusted processor of claim 1, wherein said trusted element controls the use of cryptography within said trusted execution area.

10. The trusted processor of claim 10, wherein said trusted element defines a level of trust and/or privilege to be afforded a user of said trusted processor.

11. The trusted processor of claim 1, further comprising:
    a challenge/response mechanism for securing communications across said trust boundary.

12. The trusted processor of claim 11, said challenge/response mechanism further comprising:
    a decay function for dynamically altering a challenge/response key.

13. The trusted processor of claim 12, said decay function further comprising:
    means within or associated with said trusted computing base for randomly altering said challenge/response key.

14. The trusted processor of claim 12, said decay function further comprising:
    a fixed value offset that defines a range of acceptable values for said challenge/response key.

15. The trusted processor of claim 11, wherein said challenge/response mechanism is non-repeating and/or non-predictable.

16. A trusted processor, comprising:
    a process that executes a task within a system, said process having one or more partitions that define trusted modules;
    a trust boundary established by a trusted element, said trusted element comprising a policy that implements a processor personality; and
    a trusted computing base, including a trusted execution area;
    wherein said trusted computing base is separates from said process by said trust boundary, and wherein each of said trusted modules separately access said trusted computing base and are each executed locally within said trusted execution area.

17. The trusted processor of claim 16, wherein said processor further comprises:
    at least one application having at least one adaptive kernel, wherein said adaptation is in response to a personality imposed by said policy.

18. A method for trusted processing, comprising the steps of:
    providing a process that executes a task within a system, said process having one or more partitions that define trusted modules;
    providing a trust boundary established by a trusted element; and
    providing a trusted computing base, including a trusted execution area;
    wherein said trusted computing base is separated from said process by said trust boundary, and wherein each of said trusted modules separately access said trusted computing base and are each executed locally within said trusted execution area.

19. The method of claim 18, said trusted element comprising:
   a policy.

20. The method of claim 19, wherein said policy is a tamper-resistant smart card.

21. The method of claim 19, wherein said policy implements a processor personality.

22. The method of claim 21, wherein said personality defines a level of trust and/or privilege to be afforded a user of said trusted processor.

23. The method of claim 18, further comprising the step of:
   providing a envelope for conveying information across said trust boundary.

24. The method of claim 18, further comprising the step of:
   storing information in a personal token.

25. The method of claim 24, wherein said personal token is a tamper-resistant smart card.

26. The method of claim 18, further comprising the step of:
   providing a cryptographic unit; and
   providing a policy;
   wherein said cryptographic unit is controlled by said policy, said policy comprising said trusted element.

27. The method of claim 18, said trust boundary comprising:
   a physical, electrical, and/or logical barrier.

28. The method of claim 18, said trusted element comprising:
   a hardware element that cannot be duplicated because of the manner in which it is manufactured and/or personalized.

29. The method of claim 18, wherein said trusted element controls the use of cryptography within said trusted execution area.

30. The method of claim 18, wherein said trusted element defines a level of trust and/or privilege to be afforded a user of said trusted processor.

31. The method of claim 18, further comprising the step of:
   providing a challenge/response mechanism for securing communications across said trust boundary.

32. The method of claim 31, said challenge/response mechanism further comprising the step of:
   providing a decay function for dynamically altering a challenge/response key.

33. The method of claim 32, said decay function further comprising the step of:
   providing means within or associated with said trusted computing base for randomly altering said challenge/response key.

34. The method of claim 32, said decay function further comprising the step of:
   providing a fixed value offset that defines a range of acceptable values for said challenge/response key.

35. The trusted processor of claim 31, wherein said challenge/response mechanism is non-repeating and/or non-predictable.

36. A method for trusted processing, comprising the steps of:
   providing a process that executes a task within a system, said process having one or more partitions that define trusted modules;
   providing a trust boundary established by a trusted element, said trusted element comprising a policy that implements a processor personality; and
   providing a trusted computing base, including a trusted execution area;
   wherein said trusted computing base is separated from said process by said trust boundary, and wherein each of said trusted modules separately access said trusted computing base and are each executed locally within said trusted execution area.

37. The method of claim 36, wherein said processor further comprises:
   at least one application having at least one adaptive kernel, wherein said adaptation is in response to a personality imposed by said policy.

38. A method for trusted processing, comprising the steps of:
   providing a process that executes a task within a system, said process having one or more partitions that define trusted modules;
   providing a trust boundary established by a trusted element; and
   providing a trusted computing base, including a trusted execution area;
   wherein said trusted computing base is separated from data by said trust boundary, wherein said data are collected and/or transferred to said trusted computing base for processing; and
   wherein each of said trusted modules separately access said trusted computing base.

* * * * *

UNITED STATES PATENT AND TRADEMARK OFFICE
CERTIFICATE OF CORRECTION

PATENT NO. : 5,841,869
DATED : November 24, 1998
INVENTOR(S) : Roger Merkling et al.

It is certified that error appears in the above-identified patent and that said Letters Patent is hereby corrected as shown below:

Column 16,
Line 46, delete "separates" and insert therefor -- separated --

Signed and Sealed this

Twenty-third Day of July, 2002

Attest:

JAMES E. ROGAN
Attesting Officer  Director of the United States Patent and Trademark Office